United States Patent [19]

Horiuchi

[11] Patent Number: 5,462,815

[45] Date of Patent: Oct. 31, 1995

[54] FUEL CELL POWER GENERATION SYSTEM AND METHOD OF CONTROLLING THE SAME

[75] Inventor: Yoshimi Horiuchi, Kawasaki, Japan

[73] Assignee: Fuji Electric Co., Ltd., Kanagawa, Japan

[21] Appl. No.: 108,447

[22] Filed: Aug. 19, 1993

[30] Foreign Application Priority Data

Aug. 20, 1992 [JP] Japan .................................. 4-220530

[51] Int. Cl.$^6$ ................................................. H01M 8/04
[52] U.S. Cl. ................................. 429/13; 429/22; 429/23
[58] Field of Search .................................. 429/22, 23, 13

[56] References Cited

U.S. PATENT DOCUMENTS 4,904,547  2/1990  Mizumoto et al. ........................ 429/22
5,045,414  9/1991  Bushnell et al. ........................ 429/23 X
5,156,928  10/1992  Takabayashi ............................ 429/23

Primary Examiner—Stephen Kalafut
Attorney, Agent, or Firm—Spencer, Frank & Schneider

[57] ABSTRACT

A fuel cell power generation system includes a fuel cell subsystem having a plurality of fuel cell stacks connected in parallel to each other, a reformer, an oxidant gas feeder, a fuel gas exhaust conduit, an oxidant gas exhaust conduit, an inverter, shut-off valves, an exhaust fuel gas dilution conduit, and first and second bypass conduits. When a fuel cell stack is in an abnormal state or out of order and issues an abnormality signal, a part of reformed fuel from the reformer is bypassed through the first bypass conduit to the fuel gas exhaust conduit and diluted with an inert gas such as nitrogen gas from the exhaust fuel gas dilution conduit. The diluted gas is fed to the reformer. Also, air from the oxidant gas feeder, e.g., an air blower, is partly bypassed through the second bypass conduit and the oxidant gas exhaust conduit to the reformer.

9 Claims, 2 Drawing Sheets

FUEL CELL POWER GENERATION SYSTEM AND METHOD OF CONTROLLING THE SAME

BACKGROUND OF THE INVENTION

1. Field of the Invention

The present invention relates to a fuel cell power generation system and a method of controlling the same, and more particularly to an apparatus for controlling fuel cells to be driven when at least a part of the fuel cell subsystems are out of order or in an abnormal state upon operation in a low power generation mode. The invention also relates to a method of controlling fuel cells.

2. Description of the Prior Art

Fuel cells are power generating devices which directly convert the chemical energy of fuels into electric energy. Each fuel cell has an electrolyte layer sandwiched by a pair of electrodes to which there are fed respectively an oxidant gas and a fuel gas from a reformer. The gases are reacted electrochemically in each electrode catalyst layer to generate electricity which is transmitted to outside the system.

Fuel cell power generation system comprises a large volume plant which includes a plurality of fuel cell stacks, referred to simply as stacks, connected to each other in series or in parallel. Each stack in turn has a plurality of unit cells connected in series.

In such a large volume fuel cell power generation system, the more the number of stacks the more the volume of the system and at the same time the more the frequency at which the stacks would encounter trouble. In conventional arrangements, operation of the whole power generation system must be stopped even when only one of the stacks is out of order, and operation of the system is not started again until the stack which is out of order has been recovered.

However, stopping operation of the whole system is undesirable for commercial scale power generation. Hence, it would be natural, in order to prevent stoppage of the whole power generation plant, to disconnect the or each gas conduit and the or each electric conduit of the disturbed stack or stacks from the power generation plant and continue operation of the power generation system by using only those remaining stacks that are functioning normally. When this is contemplated, however, it is difficult for the power generation system to continue to operate in some instances since the reformer, the air blower serving as an oxidant gas feeder, etc. have together a minimum load for operation. The power generation system will no longer operate if it is operated so that its output does not exceed the minimum load of the reformer and the air blower taken together when one or more stacks are out of order; i.e., if it is operated in a so-called lower output operation mode.

It would be possible to avoid stoppage of the whole power generation system by providing a plurality of reformers and air blowers each having a small volume, and controlling the number of reformers and air blowers to be used once trouble occurs to decrease the minimum load on the system. However, this solution is impractical since it leads to an increase in the amount of equipment required, an increased area for the arrangement, a decrease in the efficiency of the devices, and a complicated control apparatus.

SUMMARY OF THE INVENTION

Under the circumstances, an object of the present invention is to provide a fuel cell power generation system which is highly reliable and which allows operation even when a part of the fuel cell stacks encounters trouble while it is operated in a lower power output mode and is disconnected from the system so that the power output decreases to below the minimum load of the reformer and air blower. Another object of the present invention is to provide a method of controlling such a fuel cell power generation system.

According to a first aspect, the present invention provides a fuel cell power generation system, comprising: a fuel cell subsystem including a plurality of fuel cell stacks connected in parallel to each other; a fuel gas feed conduit connected to the fuel cell stacks for feeding a fuel gas to the fuel cell stacks; a fuel gas exhaust conduit connected to the fuel cell stacks; an oxidant gas feed conduit connected to the fuel cell stacks for feeding an oxidant gas to the fuel cell stacks; an oxidant gas exhaust conduit connected to the fuel cell stacks; shut-off valves arranged in the fuel gas feed conduit, the fuel gas exhaust conduit, the oxidant gas feed conduit and the oxidant gas exhaust conduit, the shut-off valves, when a part of the fuel cell stacks issues an abnormality signal indicating that the stack or stacks are in an abnormal state or out of order, each shutting off the feed systems of the fuel gas and the oxidant gas to the fuel cell stack or stacks that issue the abnormality signal; a reformer connected to a fuel source and the fuel cell subsystem as well as to the oxidant gas exhaust conduit, the reformer receiving an exhaust oxidant gas from the fuel cell stacks through the oxidant gas exhaust conduit and combusting an exhaust fuel gas from the fuel cell subsystem to reform raw fuel gas into hydrogen gas; an oxidant gas feeder connected to the fuel cell subsystem through the oxidant gas feed conduit for feeding an oxidant gas to the fuel cell subsystem; a first bypass conduit connected to the reformer and the fuel gas exhaust conduit, the first bypass conduit bypassing a part of the fuel gas from the reformer to the fuel gas exhaust conduit through a flow rate control valve when the part of the fuel cell stacks an abnormality signal upon operation of the fuel cell subsystem in a lower output operation mode; a second bypass conduit connected to the oxidant gas feeder and the oxidant gas exhaust conduit, the second bypass conduit bypassing a part of the oxidant gas from the oxidant gas feeder to the oxidant gas exhaust conduit through a flow rate control valve when the part of the fuel cell stacks issues an abnormality signal upon operation of the fuel cell subsystem in a lower output operation mode; an exhaust fuel gas dilution conduit connected to an inert gas source and the fuel gas exhaust conduit to which the first bypass conduit is connected, the exhaust fuel gas dilution conduit feeding an inert gas from the inert gas source and diluting the fuel gas in the exhaust fuel gas which is mixed with the fuel gas from the first bypass conduit with the inert gas to form a diluted exhaust fuel gas, and feeding the diluted exhaust fuel gas to the reformer; an inverter electrically connected to the fuel cell for converting the dc output of the fuel cells to an ac output; and a dc breaker electrically connected in series with the fuel cells in each stack the dc breaker shutting off electricity when a part of the fuel cell stacks issues an abnormality signal upon operation of the fuel cell subsystem in a lower output operation mode.

Here, the oxidant gas feeder may be an air blower.

Also, the oxidant gas feeder may be a compressor.

The inert gas may be nitrogen gas.

The fuel cell power generation system may further comprise a control device for controlling opening and closing of the first and second bypass conduits.

The control device may have an operation mode judging means for judging whether the fuel cell subsystem is in a first output operation mode or a second output operation mode, the first output operation mode generating an output equal to or lower than a predetermined output, and the second output operation mode generating an output higher than the predetermined output.

According to a second aspect, the present invention provides a method of controlling a fuel cell power generation system having a plurality of fuel cell stacks connected in parallel to each other, comprising the steps of: operating a dc breaker, when a part of the fuel cell stacks issues an abnormality signal upon operation of the fuel cell subsystem in a first output operation mode which generates an output equal to or lower than a predetermined output, to shut off feed of electricity to the part of the fuel cell stacks and also shutting off feed of fuel gas and oxidant gas to the part of the fuel cell stacks; judging whether the fuel cell subsystem operates in a first output operation mode or a second output operation mode, the first output operation mode generating an output equal to or lower than a predetermined output and the second output operation mode generating an output higher than the predetermined output, and when the fuel cell subsystem is judged to be operated at the first output operation mode, bypassing a part of fuel from a reformer to a fuel gas exhaust conduit of the fuel cell subsystem through a flow rate control valve; and judging whether the fuel cell subsystem operates in the first output operation mode or the second output operation mode, and when the fuel cell subsystem is judged to be operated at the first output operation mode, bypassing a part of an oxidant gas from an oxidant gas feeder to an oxidant gas exhaust conduit of the fuel cell subsystem through a flow rate control valve.

In the above-described fuel cell power generation system, the first bypass conduit bypasses excess fuel to an exhaust conduit for fuel gas without decreasing the load of the reformer.

The exhaust fuel gas dilution conduit dilutes excess fuel so that, in the reformer, an increase in the amount of reformed fuel due to elevation of the temperature of fuel combustion can be prevented.

The second bypass conduit bypasses excess air to the exhaust conduit for the oxidant gas.

According to the present invention, when a part of the fuel cell stacks is out of order upon operation of the system in a lower output mode, the power generation system can continue to operate by running normally functioning fuel cell stacks, and stopping operation of only the or each fuel cell stack which is out of order. Operation of the reformer and the air blower are mentioned without decreasing the output to a level below the minimum load required for the reformer, air blower, etc.

The above and other objects, effects, features and advantages of the present invention will become more apparent from the following description of embodiments thereof taken in conjunction with the accompanying drawing.

DESCRIPTION OF THE PREFERRED EMBODIMENT

Figure 1:
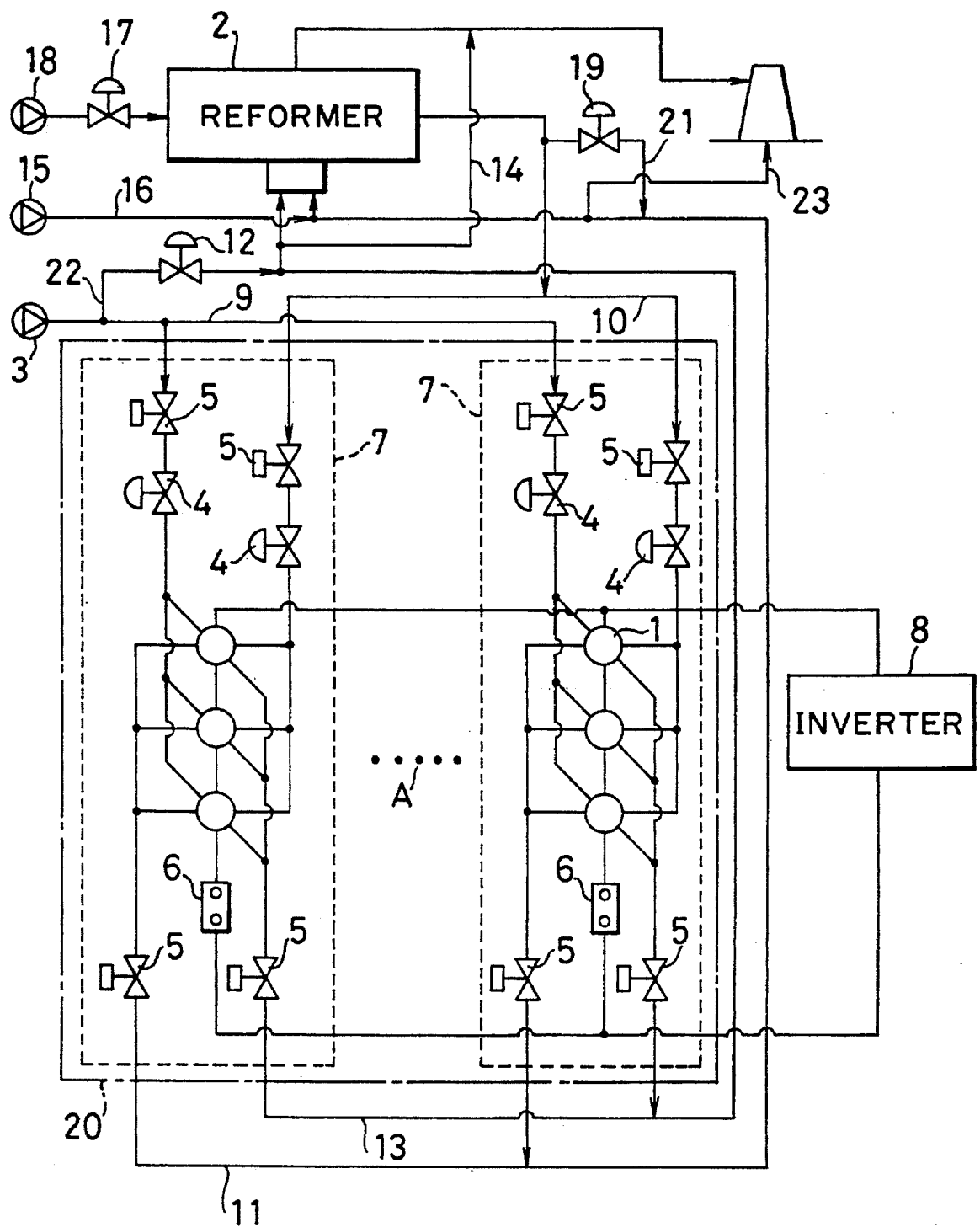
FIG. 1 is a block diagram showing a fuel cell power generation system according to an embodiment of the present invention.

Hereinafter, the present invention will be described in greater detail by example with reference to the drawing. However, the present invention should not be construed as being limited thereto.

FIG. 1 is a block diagram showing a fuel cell power generation system according to an embodiment of the present invention. As shown in FIG. 1, a plurality of unit fuel cells 1 connected in series constitute a fuel cell stack 7. A plurality of fuel cell stacks 7 constitute a fuel cell subsystem 20. In FIG. 1, dots designated by A represent additional cell stacks 7. Each fuel cell stack 7 includes a dc breaker 6 electrically connected in series with the plurality of fuel cells 1, and is connected in parallel with an inverter 8 through the dc breaker.

To each fuel cell stack 7, there are connected a fuel gas feed conduit 10 and an oxidant gas feed conduit 9, as well as fuel gas and exhaust gas conduits 11 and 13 respectively. The fuel gas feed conduit 10 and the oxidant gas feed conduit 9 each have arranged therein shut-off valves 5 and flow rate control valves 4. The exhaust conduits for fuel gas and oxidant gas, respectively, have arranged therein a shut-off valve 5.

Raw fuel gas from a raw fuel gas feeder 18 is sent to a reformer 2 through a raw fuel gas feed conduit 18a and a flow rate control valve 17. The fuel gas from the reformer 2 is fed to each fuel cell stack 7 by means of the fuel feed conduit 10. A portion of the fuel from the reformer 2 can be bypassed to the fuel gas exhaust conduit 11 through a flow rate control valve 19 and a first bypass conduit 21. The fuel gas bypassed is partly discharged to outside the system by means of a discharge conduit 23, the rest being mixed with exhaust fuel gas from the fuel cells and diluted with nitrogen gas as an inert gas from an inert gas feeder 15 in an exhaust fuel gas dilution conduit 16 to a predetermined concentration so that it can be used as the fuel gas for the reformer 2.

Air from an air blower 3 which is an oxidant gas feeder is fed to each fuel cell stack 7 by the oxidant gas feed conduit 9. A portion of the oxidant gas can be bypassed to the oxidant gas exhaust conduit 13 through a flow rate control valve 12 and a second bypass conduit 22. A part of the bypassed oxidant gas is discharged to outside the system through a discharge conduit 14, and the rest is sent to the reformer 2 so that it can serve as an oxidant gas for reforming the fuel gas. As the oxidant gas feeder, there can also be used a compressor. The oxidant gas is usually air.

Figure 2:
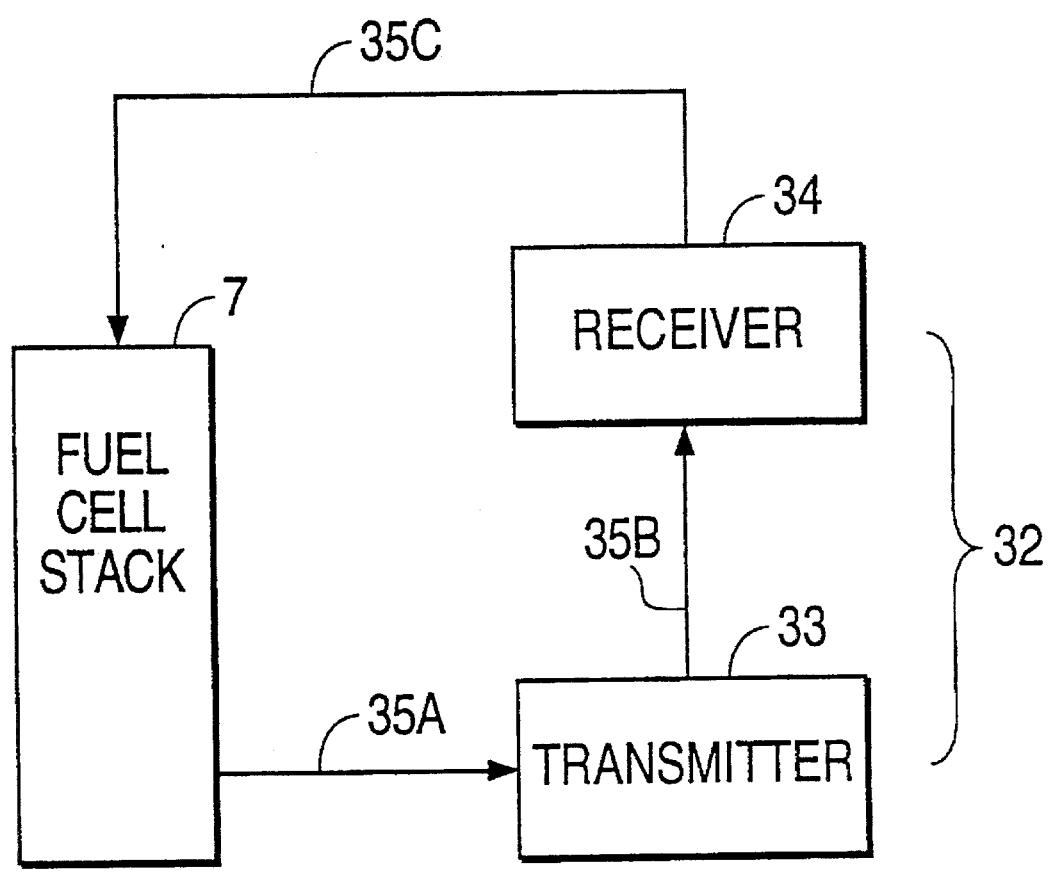
FIG. 2 is a block diagram showing a part of the fuel cell power generation system of FIG. 1.

As shown in FIG. 2, each fuel stack 7 is provided with an abnormality signal detector 32 comprising a transmitter 33 and a receiver 34. The transmitter 33 is connected through a signal line 35A to its corresponding fuel cell stack 7, and issues an abnormality signal when this fuel cell is out of order. The receiver 34 is connected to the transmitter 33 through a signal line 35B and to the fuel cell stack 7 through a signal line 35C. Abnormality of any one of the fuel cell stacks 7 is detected by the abnormality signal receiver 32 which receives the abnormality signal from the abnormality signal transmitter 33 of the fuel cell stack which is in an abnormal state or out of order. When the receiver 34 receives an abnormality signal, it issues a shut-off signal to the gas and electric systems belonging to the fuel cell stack concerned. When a part of the fuel cell stacks 7 is out of order, the gas system and electric system of the or each fuel cell stack in question are shut off. The shut-off of the gas system is performed by closing the shut-off valves in the feed conduit and the exhaust conduit for each of the fuel gas and the oxidant gas. On the other hand, the shut-off of the electric system is performed by turning the dc breaker 6 off. Closing and opening of the shut-off valves 5 in the feed and exhaust conduits, and opening and closing the dc breaker 6 in the electric system is controlled automatically and electrically. That is, the valves are closed and the breaker opened by a shut-off signal and the valves opened and the breaker closed by a return signal (restart signal). Alternatively, the shut-off valves may be closed or opened manually.

When the fuel cell subsystem has been run in a lower output operation mode, the load of the reformer 2 is not changed and a portion of the reformed gas is bypassed to the fuel gas exhaust conduit 11 through the first bypass conduit 21 by adjusting the flow rate control valve 19. Excess air from the air blower 3 is bypassed to the oxidant gas exhaust conduit 13 through the second bypass conduit 22 by adjusting the flow rate control valve 12. The bypassed gases from the reformed gas and oxidant gas, respectively, are partly discharged to outside the system through a flow rate control valve (not shown) so that the required amounts of gases are sent to the reformer 2.

Of the bypassed reformed gas, a part thereof that has not been discharged is diluted with nitrogen gas serving as an inert gas in the exhaust fuel gas dilution conduit 16 to adjust the amount of heat generated per unit flow rate to a predetermined value, and thereafter is sent so that the temperature of the reformer can be maintained at a predetermined temperature.

With the above construction, when a part of the fuel cell stacks is out of order and is operating in a lower output operation mode, it is possible to continue operation of normally functioning fuel cell stacks by stopping only the fuel cell stack or stacks which are out of order.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A fuel cell power generation system, comprising:
   a fuel cell subsystem including a plurality of fuel cell stacks connected in parallel with each other, each of said fuel cell stacks comprising at least one fuel cell and a dc breaker connected in series therewith;
   a source of raw fuel gas;
   a raw fuel gas feed conduit for feeding said raw fuel gas;
   a reformer for forming fuel gas, said reformer having first, second and third inputs, and an output, the first input being connected to said source of raw fuel gas through said raw fuel gas feed conduit;
   a fuel gas feed conduit interposed between the output of said reformer and said fuel cell stacks for feeding fuel gas to said fuel cell stacks, the fuel gas feed conduit having a fuel gas shut-off valve for each of said fuel cell stacks;
   a fuel gas exhaust conduit connected to said fuel cell stacks and to the second input of said reformer, said fuel gas exhaust conduit having a fuel gas exhaust shut-off valve for each of said fuel cell stacks;
   a source of oxidant gas;
   an oxidant gas feed conduit for connecting said source of oxidant gas to said fuel cell stacks;
   an oxidant gas exhaust conduit connected to said fuel cell stacks and to the third input of said reformer, said oxidant gas exhaust conduit having an oxidant gas exhaust shut-off valve for each of said fuel cells stacks;
   said reformer receiving exhaust oxidant gas and exhaust fuel gases from said oxidant and fuel gas exhaust conduits, respectively, for reforming said exhaust fuel gas into said fuel gas and feeding said fuel gas to said fuel cell subsystem;
   a first bypass conduit interposed between said reformer and said fuel gas exhaust conduit, said first bypass conduit having a first flow rate control valve therein;
   a second bypass conduit interposed between said oxidant gas feed conduit and said oxidant gas exhaust conduit, said second bypass conduit having a second flow rate control valve therein;
   a plurality of abnormality detectors, one of said detectors being connected to each of said fuel cell stacks for detecting the output thereof, each of said abnormality detectors generating a shut-off signal when the output of the fuel cell stack to which it is connected decreases to an amount below which the total load on said source of oxidant gas and on said reformer has reached a predetermined minimum value required for operation of said power generation system, said shut-off signal shutting the fuel gas, fuel gas exhaust, oxidant gas and oxidant gas exhaust shut-off valves, operating said first flow rate control valve to bypass a part of the fuel gas from said reformer to said fuel gas exhaust conduit, operating said second flow rate control valve to bypass a part of the oxidant gas from said source of oxidant gas to said oxidant gas exhaust conduit, and opening the dc breaker of the fuel cell stack connected to the abnormality detector which generated said shut-off signal; and
   an inverter electrically connected in parallel with said at least one fuel cell of each of said fuel cell stacks, through said dc breaker, for converting a DC output of said fuel cells to an AC output.

2. The fuel cell power generation system as claimed in claim 1, wherein said source of oxidant gas is an air blower.

3. The fuel cell power generation system as claimed in claim 1, wherein said source of oxidant gas is a compressor.

4. The fuel cell power generation system as claimed in claim 1, further comprising a source of inert gas for diluting said exhaust fuel gas and a conduit connected to said source of inert gas for feeding said inert gas to said fuel gas exhaust conduit.

5. The fuel cell power generation system as claimed in claim 4, wherein said inert gas is nitrogen gas.

6. The fuel cell power generation system as claimed in claim 1, wherein each of said abnormality detectors has an operation mode judging means for judging whether said fuel cell subsystem is operating in a first output operation mode or a second output operation mode, said first output operation mode generating an output equal to or lower than a predetermined output, and said second output operation mode generating an output higher than said predetermined output, said predetermined output being equal to an amount below which the total load on said source of oxidant gas and on said reformer has reached a minimum value required for operation of said power generating system.

7. The fuel cell power generation system as claimed in claim 1, wherein said reformed gas is hydrogen gas.

8. A method of controlling a fuel cell power generation system comprising a plurality of fuel cell stacks each having at least one fuel cell and a dc breaker connected in series therewith, an abnormality detector associated with each of said fuel cell stacks, a reformer for feeding fuel gas to said fuel cell stacks, and means for feeding oxidant gas to said fuel cell stacks, said method, upon issuance of an abnormality signal by the abnormality detector of a given fuel cell stack indicating that the given fuel cell stack has generated an output below a minimum value required for operation of the fuel cell power generation system, comprising the steps of:

opening the dc breaker of the given fuel cell stack and stopping the feeding of fuel gas and oxidant gas to the given fuel cell stack;

discharging a part of the fuel gas from the reformer to outside the power generation system; and discharging a part of the oxidant gas to outside the power generation system.

9. The method claimed in claim 8 wherein said fuel cell power generation system further comprises first and second flow rate control valves, and wherein the amount of fuel gas and oxidant gas discharged to outside the system are controlled by the first and second flow rate control valves respectively.

* * * * *